(12) United States Patent  
Sharma et al.

(10) Patent No.: US 8,937,619 B2  
(45) Date of Patent: Jan. 20, 2015

(54) GENERATING AN OBJECT TIME SERIES FROM DATA OBJECTS

(71) Applicant: Palantir Technologies, Inc., Palo Alto, CA (US)

(72) Inventors: Tilak Sharma, Palo Alto, CA (US); Steve Chuang, Saratoga, CA (US); Rico Chiu, Palo Alto, CA (US); Andrew Shi, Palo Alto, CA (US); Lindsay Canfield, Santa Clara, CA (US); Adit Kumar, New York, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/148,559

(22) Filed: Jan. 6, 2014

(65) Prior Publication Data

US 2014/0267295 A1    Sep. 18, 2014

Related U.S. Application Data

(60) Provisional application No. 61/799,691, filed on Mar. 15, 2013.

(51) Int. Cl.  
*G06T 11/20* (2006.01)

(52) U.S. Cl.  
CPC .................................... *G06T 11/206* (2013.01)  
USPC ........................................................ 345/440

(58) Field of Classification Search  
USPC ........................................................ 345/440  
See application file for complete search history.

(56) References Cited

U.S. PATENT DOCUMENTS

| | | |
|---|---|---|
| 5,670,987 A | 9/1997 | Doi et al. |
| 6,161,098 A | 12/2000 | Wallman |
| 6,219,053 B1 | 4/2001 | Tachibana et al. |
| 6,232,971 B1 | 5/2001 | Haynes |
| 6,279,018 B1 | 8/2001 | Kudrolli et al. |
| 6,341,310 B1 | 1/2002 | Leshem et al. |
| 6,369,835 B1 | 4/2002 | Lin |
| 6,549,944 B1 | 4/2003 | Weinberg et al. |
| 6,714,936 B1 | 3/2004 | Nevin, III |
| 6,839,745 B1 | 1/2005 | Dingari et al. |
| 7,139,800 B2 | 11/2006 | Bellotti et al. |

(Continued)

FOREIGN PATENT DOCUMENTS

| | | |
|---|---|---|
| WO | WO 2009/061501 | 5/2009 |
| WO | WO 2010/030913 | 3/2010 |

OTHER PUBLICATIONS

"A First Look: Predicting Market Demand for Food Retail using a Huff Analysis," TRF Policy Solutions, Jul. 2012, pp. 30.

(Continued)

*Primary Examiner* — David Zarka  
*Assistant Examiner* — Vu Nguyen  
(74) *Attorney, Agent, or Firm* — Knobbe, Martens, Olson & Bear, LLP

(57) ABSTRACT

Systems and methods are presented for representing non-numerical data objects in an object time series. An object time series of can be created by establishing one or more associations, each association including a mapping of at least one point in time with one or more objects that include properties and values. Visual representation of an object time series may include displaying non-numerical values associated with objects in the object time series in association with respective points in time.

20 Claims, 15 Drawing Sheets

(56) References Cited

U.S. PATENT DOCUMENTS

| | | | |
|---|---|---|---|
| 7,171,427 B2 | 1/2007 | Witkowski et al. | |
| 7,278,105 B1 | 10/2007 | Kitts | |
| 7,379,903 B2 | 5/2008 | Caballero et al. | |
| 7,426,654 B2 | 9/2008 | Adams et al. | |
| 7,454,466 B2 | 11/2008 | Bellotti et al. | |
| 7,467,375 B2 | 12/2008 | Tondreau et al. | |
| 7,525,422 B2 | 4/2009 | Bishop et al. | |
| 7,617,232 B2 | 11/2009 | Gabbert et al. | |
| 7,627,812 B2 | 12/2009 | Chamberlain et al. | |
| 7,634,717 B2 | 12/2009 | Chamberlain et al. | |
| 7,703,021 B1 | 4/2010 | Flam | |
| 7,716,077 B1 | 5/2010 | Mikurak | |
| 7,725,547 B2 | 5/2010 | Albertson et al. | |
| 7,770,100 B2 | 8/2010 | Chamberlain et al. | |
| 7,818,658 B2 | 10/2010 | Chen | |
| 7,962,848 B2 | 6/2011 | Bertram | |
| 8,001,465 B2 | 8/2011 | Kudrolli et al. | |
| 8,001,482 B2 | 8/2011 | Bhattiprolu et al. | |
| 8,015,487 B2 | 9/2011 | Roy et al. | |
| 8,225,201 B2 | 7/2012 | Michael | |
| 8,230,333 B2 | 7/2012 | Decherd et al. | |
| 8,447,722 B1 | 5/2013 | Ahuja et al. | |
| 8,489,641 B1 | 7/2013 | Seefeld et al. | |
| 8,514,082 B2 | 8/2013 | Cova et al. | |
| 8,554,579 B2 | 10/2013 | Tribble et al. | |
| 8,577,911 B1 | 11/2013 | Stepinski et al. | |
| 8,620,641 B2 | 12/2013 | Farnsworth et al. | |
| 8,689,108 B1 | 4/2014 | Duffield et al. | |
| 8,713,467 B1 | 4/2014 | Goldenberg et al. | |
| 2001/0021936 A1 | 9/2001 | Bertram | |
| 2002/0130907 A1 | 9/2002 | Chi et al. | |
| 2002/0174201 A1 | 11/2002 | Ramer et al. | |
| 2003/0028560 A1 | 2/2003 | Kudrolli et al. | |
| 2003/0200217 A1 | 10/2003 | Ackerman | |
| 2004/0085318 A1 | 5/2004 | Hassler et al. | |
| 2004/0095349 A1 | 5/2004 | Bito et al. | |
| 2004/0181554 A1 | 9/2004 | Heckerman et al. | |
| 2005/0028094 A1 | 2/2005 | Allyn | |
| 2005/0125715 A1 | 6/2005 | DiFranco et al. | |
| 2005/0180330 A1 | 8/2005 | Shapiro | |
| 2006/0026170 A1 | 2/2006 | Kreitler et al. | |
| 2006/0045470 A1 | 3/2006 | Poslinski et al. | |
| 2006/0074866 A1 | 4/2006 | Chamberlain et al. | |
| 2006/0080619 A1 | 4/2006 | Carlson et al. | |
| 2006/0129746 A1 | 6/2006 | Porter | |
| 2007/0174760 A1 | 7/2007 | Chamberlain et al. | |
| 2007/0266336 A1 | 11/2007 | Nojima et al. | |
| 2008/0077597 A1 | 3/2008 | Butler | |
| 2008/0077642 A1 | 3/2008 | Carbone et al. | |
| 2008/0243711 A1* | 10/2008 | Aymeloglu et al. | 705/36 R |
| 2008/0263468 A1 | 10/2008 | Cappione et al. | |
| 2008/0276167 A1 | 11/2008 | Michael | |
| 2009/0076845 A1 | 3/2009 | Bellin et al. | |
| 2009/0094166 A1* | 4/2009 | Aymeloglu et al. | 705/36 R |
| 2009/0132953 A1 | 5/2009 | Reed et al. | |
| 2009/0164934 A1 | 6/2009 | Bhattiprolu et al. | |
| 2009/0172511 A1 | 7/2009 | Decherd et al. | |
| 2009/0281839 A1 | 11/2009 | Lynn et al. | |
| 2009/0287470 A1 | 11/2009 | Farnsworth et al. | |
| 2010/0070897 A1 | 3/2010 | Aymeloglu et al. | |
| 2010/0122152 A1 | 5/2010 | Chamberlain et al. | |
| 2010/0293174 A1 | 11/2010 | Bennett et al. | |
| 2010/0306713 A1 | 12/2010 | Geisner et al. | |
| 2010/0325581 A1 | 12/2010 | Finkelstein et al. | |
| 2011/0047159 A1 | 2/2011 | Baid et al. | |
| 2011/0060753 A1 | 3/2011 | Shaked et al. | |
| 2011/0119100 A1* | 5/2011 | Ruhl et al. | 705/7.11 |
| 2011/0167105 A1 | 7/2011 | Ramakrishnan et al. | |
| 2011/0208724 A1 | 8/2011 | Jones et al. | |
| 2011/0291851 A1 | 12/2011 | Whisenant | |
| 2011/0310005 A1 | 12/2011 | Chen et al. | |
| 2012/0019559 A1 | 1/2012 | Siler et al. | |
| 2012/0036434 A1 | 2/2012 | Oberstein | |
| 2012/0144335 A1 | 6/2012 | Abeln et al. | |
| 2012/0196558 A1 | 8/2012 | Reich et al. | |
| 2012/0221580 A1 | 8/2012 | Barney | |
| 2012/0246148 A1 | 9/2012 | Dror | |
| 2012/0330973 A1 | 12/2012 | Ghuneim et al. | |
| 2013/0046842 A1 | 2/2013 | Muntz et al. | |
| 2013/0061169 A1 | 3/2013 | Pearcy et al. | |
| 2013/0073377 A1 | 3/2013 | Heath | |
| 2013/0097482 A1 | 4/2013 | Marantz et al. | |
| 2013/0224696 A1 | 8/2013 | Wolfe et al. | |
| 2013/0262527 A1 | 10/2013 | Hunter et al. | |
| 2013/0290011 A1 | 10/2013 | Lynn et al. | |
| 2013/0290825 A1 | 10/2013 | Arndt et al. | |
| 2014/0019936 A1 | 1/2014 | Cohanoff | |
| 2014/0032506 A1 | 1/2014 | Hoey et al. | |
| 2014/0033010 A1 | 1/2014 | Richardt et al. | |

OTHER PUBLICATIONS

Acklen, Laura, "Absolute Beginner's Guide to Microsoft Word 2003," Dec. 24, 2003, pp. 15-18, 34-41, 308-316.

Ananiev et al., "The New Modality API," http://web.archive.org/web/20061211011958/http://java.sun.com/developer/technicalArticles/J2SE/Desktop/javase6/modality/ Jan. 2006, pp. 8.

Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.

Chen et al., "Bringing Order to the Web: Automatically Categorizing Search Results," CHI '00, Proceedings of the SIGCHI conference on Human Factors in Computing Systems, pp. 145-152.

Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.

GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.

Griffith, Daniel A., "A Generalized Huff Model," Geographical Analysis, Apr. 1982, vol. 14, No. 2, pp. 135-144.

Hibbert et al., "Prediction of Shopping Behavior Using a Huff Model Within a GIS Framework," Healthy Eating in Context Mar. 18, 2011, pp. 16.

Huff et al., "Calibrating the Huff Model Using ArcGIS Business Analyst," ESRI, Sep. 2008, pp. 33.

Huff, David L., "Parameter Estimation in the Huff Model," ESRI, ArcUser, Oct.-Dec. 2003, pp. 34-36.

International Search Report and Written Opinion in Application No. PCT/US2009/056703, dated Mar. 15, 2010.

Keylines.com, "An Introduction to KeyLines and Network Visualization," Mar. 2014, http://keylines.com/wp-content/uploads/2014/03/KeyLines-White-Paper.pdf downloaded May 12, 2014 in 8 pages.

Keylines.com, "KeyLines Datasheet," Mar. 2014, http://keylines.com/wp-content/uploads/2014/03/KeyLines-datasheet.pdf downloaded May 12, 2014 in 2 pages.

Keylines.com, "Visualizing Threats: Improved Cyber Security Through Network Visualization," Apr. 2014, http://keylines.com/wp-content/uploads/2014/04/Visualizing-Threats1.pdf downloaded May 12, 2014 in 10 pages.

Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.

Manske, "File Saving Dialogs," http://www.mozilla.org/editor/ui_specs/FileSaveDialogs.html Jan. 20, 1999, pp. 7.

Map of San Jose, CA. Retrieved Oct. 2, 2013 from http://maps.google.com.

Map of San Jose, CA. Retrieved Oct. 2, 2013 from http://maps.bing.com.

Map of San Jose, CA. Retrieved Oct. 2, 2013 from http://maps.yahoo.com.

Microsoft—Developer Network, "Getting Started with VBA in Word 2010," Apr. 2010, http://msdn.microsoft.com/en-us/library/ff604039%28v=office.14%29.aspx as printed Apr. 4, 2014 in 17 pages.

(56) References Cited

OTHER PUBLICATIONS

Microsoft Office—Visio, "About connecting shapes," http://office.microsoft.com/en-us/visio-help/about-connecting-shapes-HP085050369.aspx printed Aug. 4, 2011 in 6 pages.

Microsoft Office—Visio, "Add and glue connectors with the Connector tool," http://office.microsoft.com/en-us/visio-help/add-and-glue-connectors-with-the-connector-tool-HA010048532.aspx?CTT=1 printed Aug. 4, 2011 in 1 page.

Official Communication in New Zealand Application No. 624557 dated May 14, 2014.

\* cited by examiner

GENERATING AN OBJECT TIME SERIES FROM DATA OBJECTS

CROSS REFERENCE TO RELATED APPLICATIONS

This application claims priority to U.S. Provisional Application No. 61/799,691, entitled "OBJECT TIME SERIES," which was filed Mar. 15, 2013 and is hereby incorporated by reference in its entirety.

TECHNICAL FIELD

The present disclosure relates to systems and techniques for data integration, analysis, and visualization. More specifically, representing non-numerical data objects in a time series.

BACKGROUND

Traditionally, time series are created and used to store numerical data associated with a plurality of points in time. Non-numerical data are usually stored and used as metadata.

DETAILED DESCRIPTION OF CERTAIN EMBODIMENTS

Definitions

Figure 1:
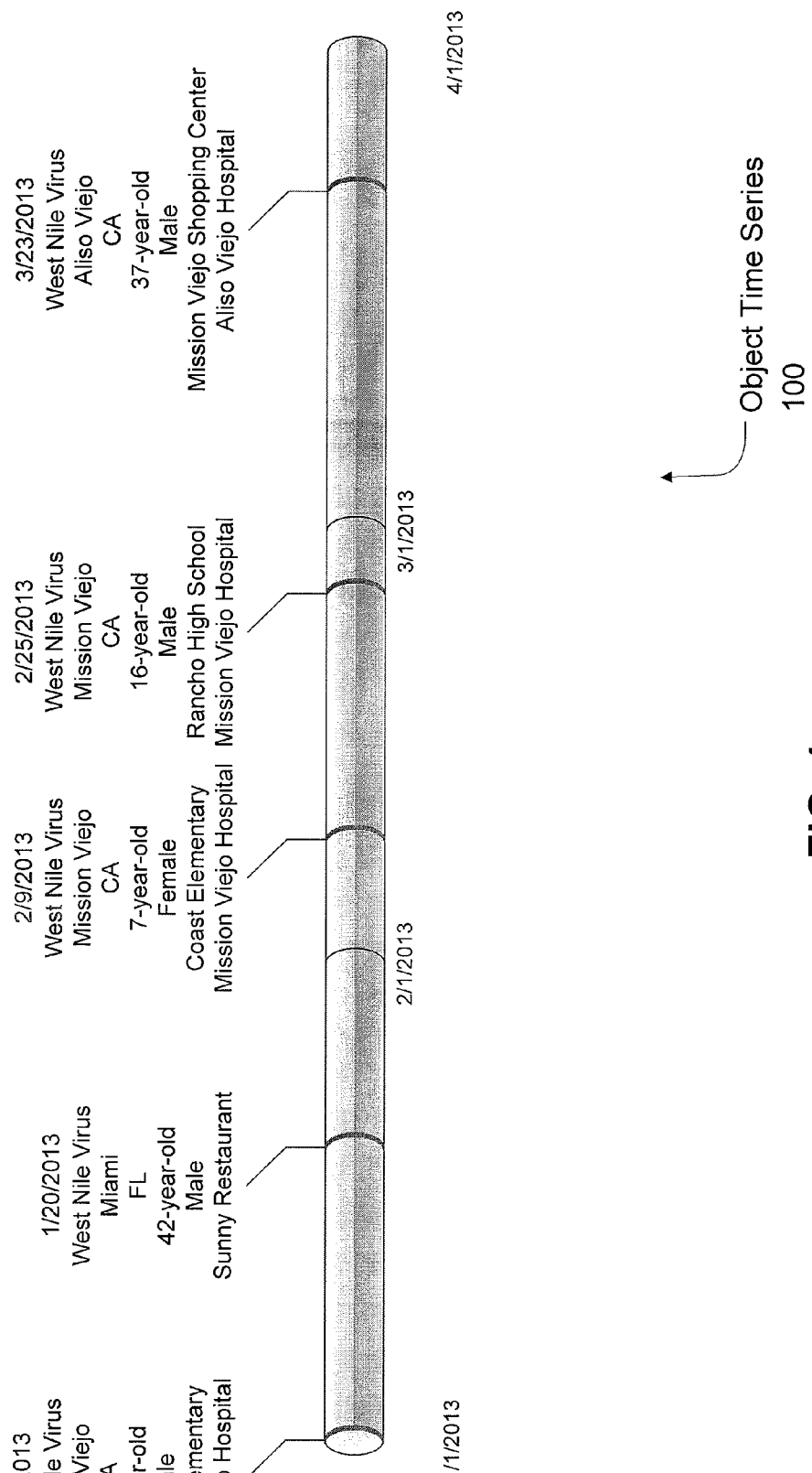
FIG. 1 illustrates one embodiment of a visualization of an object time series that may be generated and presented to a user.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), spreadsheets, XML files, and text file, among others.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Object Time Series: associating multiple points in time with one or more objects, for example, People, Event, and so forth. Objects included in Object Time Series may be any type of objects, including numerical objects and non-numerical objects.

Overview of Object Time Series

Traditional time series may store data in the format of TIME, VALUE, otherwise known as a tick. For example, the stock price of Microsoft ("MSFT") may be represented by a specific time of any given business day, and a value of the stock at that specific time. However, using traditional time series data types to store generic values that are not numerical may be very difficult because data about objects 201 and about specific object types such as person, event, document, and so forth, when associated with a time series, have been traditionally implemented as metadata associated with values in time series.

For example, in the MSFT stock price use case, specific milestones such as quarterly earnings reports, board meetings, and dividends may be associated with a specific value of the MSFT stock price in a time series. However, such milestones (event) data may not be easily represented because traditional time series treat the milestones as metadata (e.g. not objects in themselves, but as descriptive text data associated with a numeric time series). Accessing such metadata may require several steps of referencing and/or mapping. Slicing and sampling traditional time series data based on metadata is also inefficient and difficult. Details regarding traditional time series are discussed further below.

An Object Time Series may instead directly associate time with any object. For example, instead of limiting the value associated with a point in time to numerical values, any object type may be used, such as Person, Event, and so forth.

FIG. 1 illustrates one embodiment of a visualization of an object time series that may be generated and presented to a user. In this example, an Object Time Series 100 is plotted. The Object Time Series 100 spans from Jan. 1, 2013 to Apr. 1, 2013. The data object associated with each date in the Object Time Series 100 is a Contagious Disease Report object. As a data object, the Contagious Disease Report object may contain properties such as: (1) type of contagious disease; (2) location; (3) State; (4) a patient object (age, gender, occupation); (5) hospital where the patient is or has been treated. As can be seen in this example, the object associated with an Object Time Series may itself contain other object types, which may involve more properties. Thus, Object Time Series may associate rich information and object types with time/dates.

In some embodiments, Object Time Series 100 data may be plotted similar to traditional time series, such as the example in FIG. 1. In some other embodiments, data involved in object time series may be used to identify links and/or relationships. For example, if the Object Time Series 100 is named a Disease OTS, then executing a function such as DiseaseOTS.location( ) may automatically generate a list of all locations that a disease has been reported, which may be the following list: (Aliso Viejo, Miami, Mission Viejo). In another example, executing a function such as DiseaseOTS.occupation( ) may generate the following list automatically: (Coast Elementary, Rancho High School, Mission Viejo Shopping Center, Sunny Restaurant). Moreover, in some embodiments, the list of locations generated may be automatically mapped to the respective points in time. Advantageously, this would allow a disease to be tracked by location in relation to time.

As shown in the example in FIG. 1, the objects stored in Object Time Series 100 may include not only numerical values, but also other data types involving multiple properties. For example, the hospitals in Object Time Series 100 may be associated property values such as hospital location, treating physician, and so forth.

In some embodiments, Object Time Series 100 may also enable fast visualization and association between stored objects at various points in time. For example, because the occupation information may be directly accessible and visualized in Object Time Series 100, an analyst reviewing the DiseaseOTS Object Time Series may easily find that West Nile Virus has been reported regarding two Coast Elementary School children, reported on Jan. 1, 2013 and Feb. 9, 2013, respectively. Moreover, it may be easy to show that both Mission Viejo and Aliso Viejo have been reported to have West Nile occurrences twice. More details regarding Object Time Series are discussed further herein.

Object Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
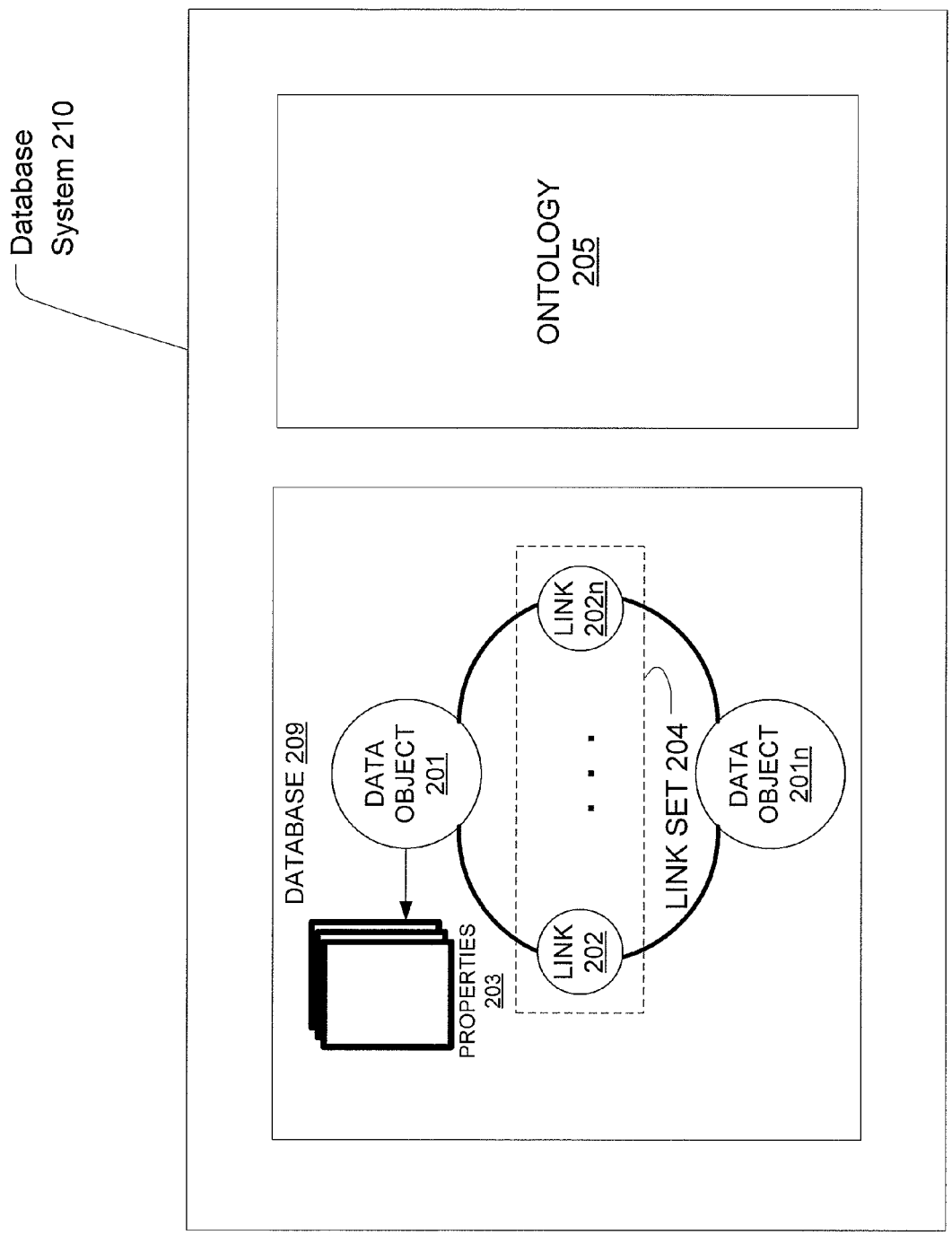
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205.

The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
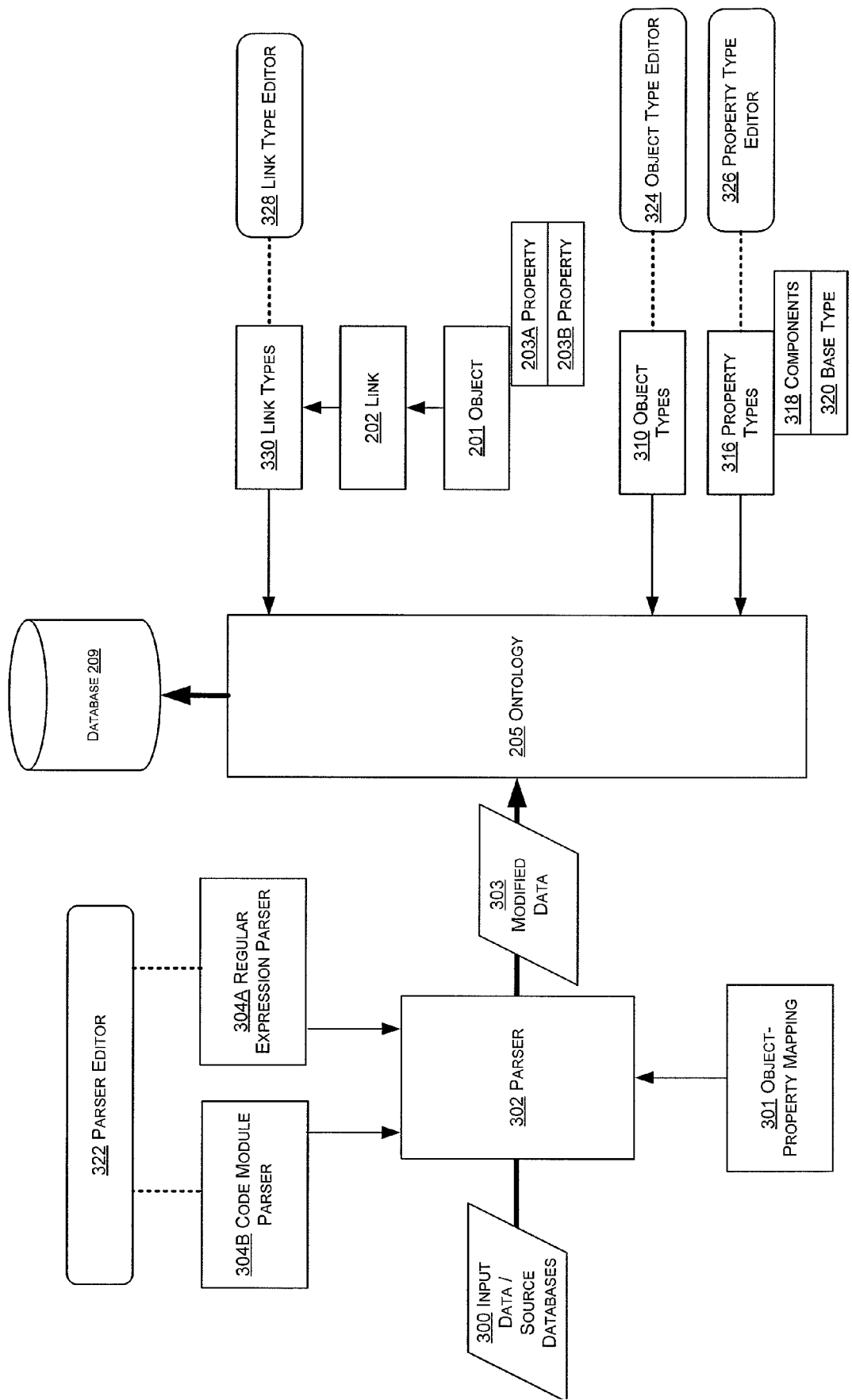
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Figure 4:
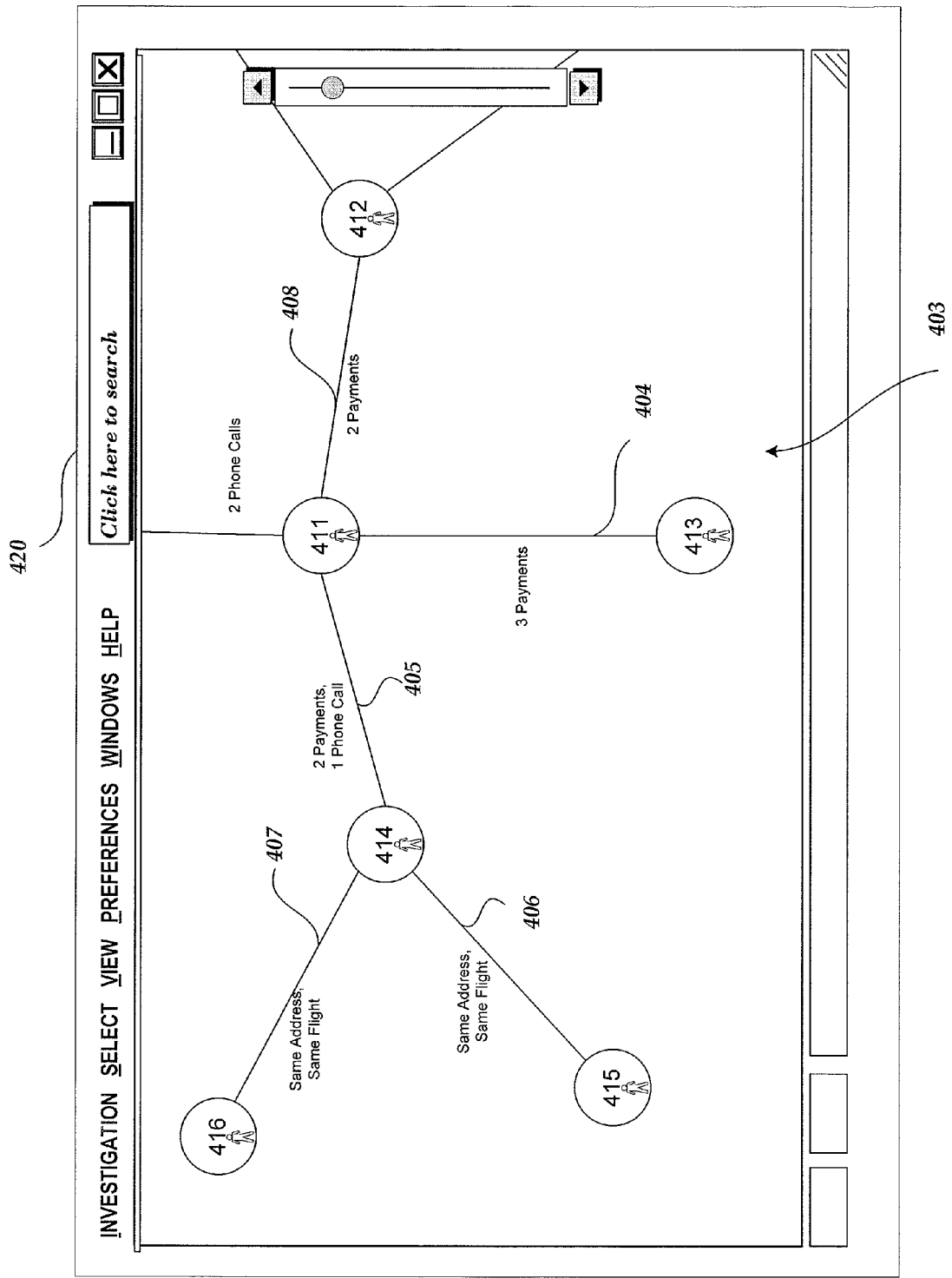
FIG. 4 illustrates a sample user interface using relationships described in a data store using a dynamic ontology.

The properties, objects, and the links (e.g. relationships) between the objects can be visualized using a graphical user interface (GUI). For example, FIG. 4 displays a user interface showing a graph representation 403 of relationships (including relationships or links 404, 405, 406, 407, 408) between the data objects (including data objects 411, 412, 413, 414, 415, 416) that are represented as nodes in the example of FIG. 4. In this embodiment, the data objects are person objects. In this example, the person nodes (associated with person data objects) may have relationships to other person nodes, for example, through payment objects. For example, relationship 404 is based on a payment associated with the individuals indicated in person data objects 411 and 413. The link 404 represents these shared payments (for example, the individual associated with data object 411 may have paid the individual associated with data object 413 on three occasions). These relationships may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 108 may be searched using a search interface 420 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Object Time Series

Figure 5:
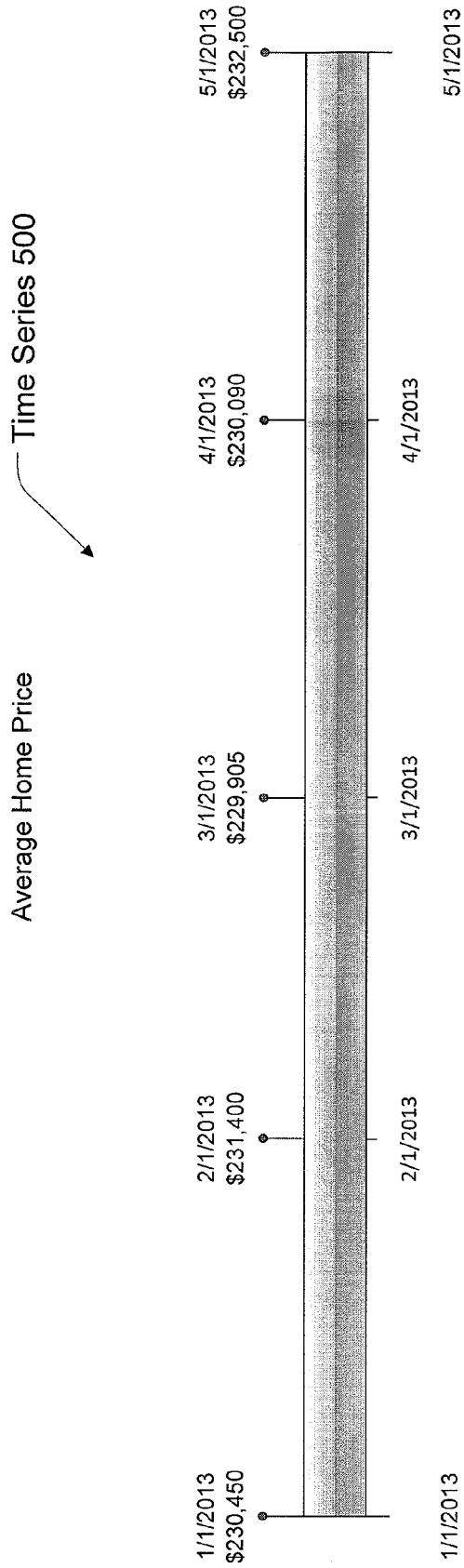
FIG. 5 illustrates an example figure that may be generated and presented to a user to visualize a traditional time series with associating numerical values.

FIG. 5 illustrates an example figure that may be generated and presented to a user to visualize a traditional time series 500 with associated numeric values. In time series 500, the time series bar represents five months, beginning from Jan. 1, 2013 and ending on May 1, 2013. At the beginning of each month, a numerical value is associated with the date. For example, the numerical value associated with Jan. 1, 2013 is $230,450. The numerical value associated with Feb. 1, 2013 is $231,400. The numerical value associated with Mar. 1, 2013 is $229,905. The numerical value associated with Apr. 1, 2013 is $230,090. The numerical value associated with May 1, 2013 is $232,500.

Traditional time series such as time series 500 stores a date/time and a numerical value. However, in order to find out other data associated with the numerical value, further steps may be needed. For example, in some embodiments, a traditional time series 500 may implement an array that stores (DATE, VALUE) pairs, for example:

$$\begin{bmatrix} (1/1/2013, 230, 450), \\ (2/1/2013, 231, 400), \\ \ldots \\ (5/1/2013, 232, 500) \end{bmatrix}.$$

Another array may be used with the traditional time series 500 to store metadata associated with a date/time, such as whether the home price was above or below average for that time period, which may also be referred to as a "tick." For example:

$$\begin{bmatrix} (1/1/2013, \text{"above"}), \\ (2/1/2013, \text{"below"}), \\ \ldots \\ (5/1/2013, \text{"above"}) \end{bmatrix}.$$

In situations where metadata regarding categories such as "above" a value, "below" a value, on or after a certain date are accessed, a separate look up needs to be performed before the metadata may be interpreted. For example, knowing that the metadata associated with Jan. 1, 2013 is "above" may tell a user that the specific home price on Jan. 1, 2013 is above average. However, a separate lookup needs to be performed to find out what the average home value is. Accessing details regarding the value associated with the traditional time series and accessing metadata thus involves two separate steps accessing values stored in two separate data structures, which may be computationally costly, especially if searching is involved.

Therefore, as shown in this example, in a traditional time series 500, finding the metadata associated with a numerical value may require a lookup step or a mapping step that looks up a separate array. If there are more than one metadata fields, such lookup step may be computationally costly.

Moreover, in a traditional time series 500, it is also difficult to create a sample or slice of the time series that also includes the metadata. For example, metadata associated with the home price example discussed above may include state and/or city, population, average household income. Creating a sample or a slice of the traditional time series 500 would involve mapping steps that separately look up each array or other data structure that stores the metadata involving state, array or data structure that stores population, and so forth.

A traditional time series may also store metadata as a set of intervals. Each interval may contain a starting data, and ending date, and a status during the interval. For example, a time series may track a house's price over time. Each tick represents a date and an associated price for the house. However, other metadata may also be tracked in association with that time series, such as the status of the loan associated with that house over time (e.g. "loan up-to-date", "loan payment behind 30 days", "loan payment behind 60 days", etc.). A traditional time series may not use an array of ticks to represent this status information. Instead, it may use a set of intervals. For example, one interval may be [Apr. 30, 2011, Dec. 29, 2011, "loan up-to-date"], and another may be [Dec. 30, 2011, Feb. 6, 2012, "loan payment behind 30 days], and yet another may be [Feb. 7, 2012, Dec. 29, 2012, "loan up-to-date"].

One problem with representing statuses as intervals is that they cannot be easily sliced or subsetted. For example, data in the data structure itself may need to be duplicated to split such intervals. If a time series is sliced on Jan. 1, 2012 as a split date, the interval needs to be applied to both new time series, with the interval now split. Object time series does not have these limitations. In addition, intervals may overlap, whereas ticks in an object time series may not overlap when tracking metadata, making it easier to perform transformations and analysis on the metadata.

Figure 6:
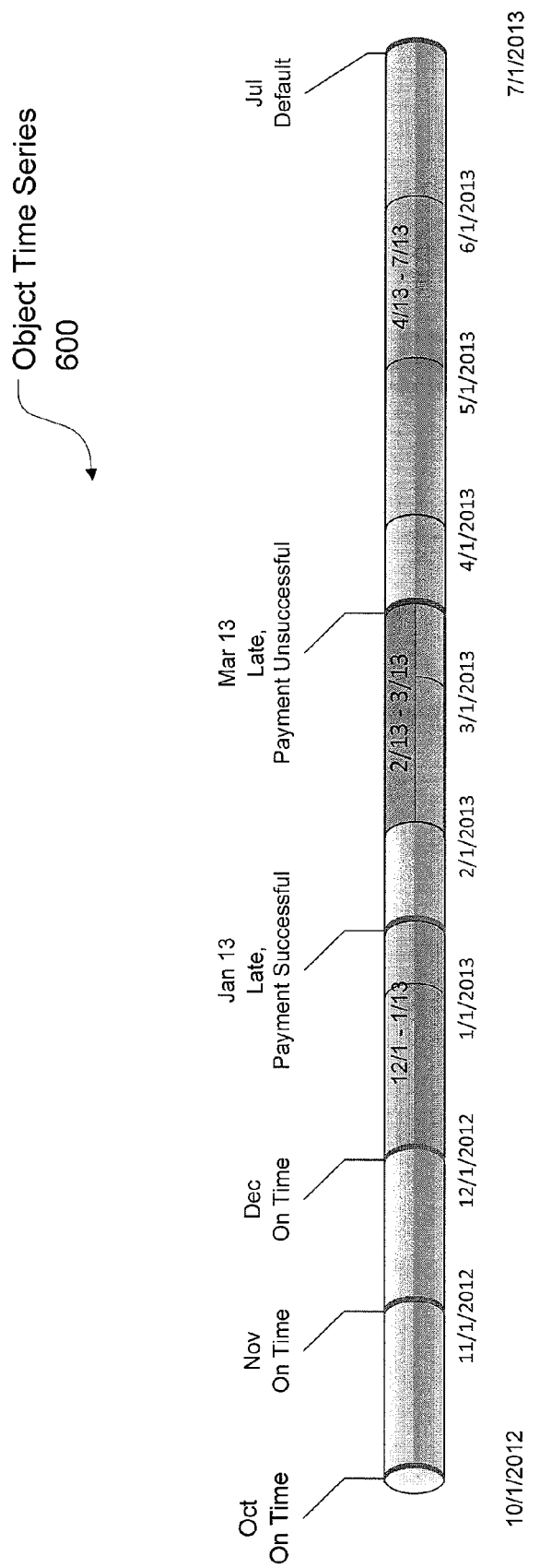
FIG. 6 illustrates an example figure that may be generated and presented to a user to visualize an Object Time Series associated with a specific instance of a payment event object.

FIG. 6 illustrates an example figure that may be generated and presented to a user to visualize an Object Time Series 600 associated with a specific instance of a payment event object. In this embodiment, the Object Time Series 600 includes a time series bar that displays a time period between Oct. 1, 2012 and Jul. 1, 2013.

In this example, a Payment object type is associated with the Object Time Series. Due dates for the Payment object is set to the first day of each month. Each Payment object may include properties such as timeliness with values indicating whether a payment is on time, late, or in default. Each Payment object may also include properties such as payment with values indicating whether a payment was successful or unsuccessful. In some instances, a payment may be unsuccessful because a payment check is bounced by a bank or there are not sufficient funds to complete a payment transaction. In some embodiments, all the properties of an object may be configured to be displayed or plotted. In some other embodiments, some properties of an object may be configured to be displayed whereas some other properties of an object may be configured not to be displayed.

In some embodiments, objects in an Object Time Series may be displayed next to the respective points in time. For example, in FIG. 6, dates on which payments are made are displayed. For example, on Oct. 1, 2012, a payment is made and it is on time. On Nov. 1, 2012, a payment is made and it is also on time. On Dec. 1, 2012, an on-time payment is also made.

In some embodiments, certain objects may be configured to be not shown directly in a visualization of an Object Time Series. For example, in Object Time Series 600, missed payments may be configured in such a way that they are not displayed next to the due date, which may be the first day of a month. In some other embodiments, missed payments may also be displayed.

On Jan. 1, 2013, a payment is missed. However, on Jan. 13, 2013, a late payment is made, and it is successful. No payment is made on either Feb. 1, 2013. On Mar. 1, 2013, there is also no payment. On Mar. 13, 2013, a late payment is made. However, this late payment is unsuccessful. Payment dates are also missed on April 1, May 1, and June $1^{st}$. By Jul. 1, 2013, the property value of the Payment object is set to default after 5 consecutive months without a successful payment.

As shown in the example in FIG. 6, unlike traditional time series that use metadata to associate non-numerical values with respective points in time, any type of Object and property values may be directly associated with respective points in time in an Objective Time Series.

In some embodiments, information regarding intervals between two or more points in time may be easily identified by comparing the values of the objects associated with an Object Time Series. For example, in FIG. 6, information regarding the interval between Dec. 1, 2012 and Jan. 13, 2013 may be determined by comparing the values of the property timeliness. The value of the property timeliness of the Payment object associated with Dec. 1, 2012 is "on time." The value of the property timeliness of the Payment object associated with Jan. 13, 2013 is "late". Therefore, during the interval between Dec. 1, 2012 and Jan. 13, 2013, payment timeliness has changed from "on time" to "late".

In some embodiments, the values in each object associated with an Object Time Series may also contain other objects. For example, the Payment object involved in Object Time Series 600 may contain a property payment success, and this property may contain a value that is an object in itself. For example, the value may contain a link object. For example, on Mar. 13, 2013, a late and unsuccessful payment is made. The value of payment unsuccessful may contain a link object, which links the unsuccessful payment to a detailed description of the failed payment transaction. In some embodiments, such information may be configured to be displayed, while in other embodiments, such information may be configured in such a way that it is not displayed next to an Object Time Series.

Figure 7:
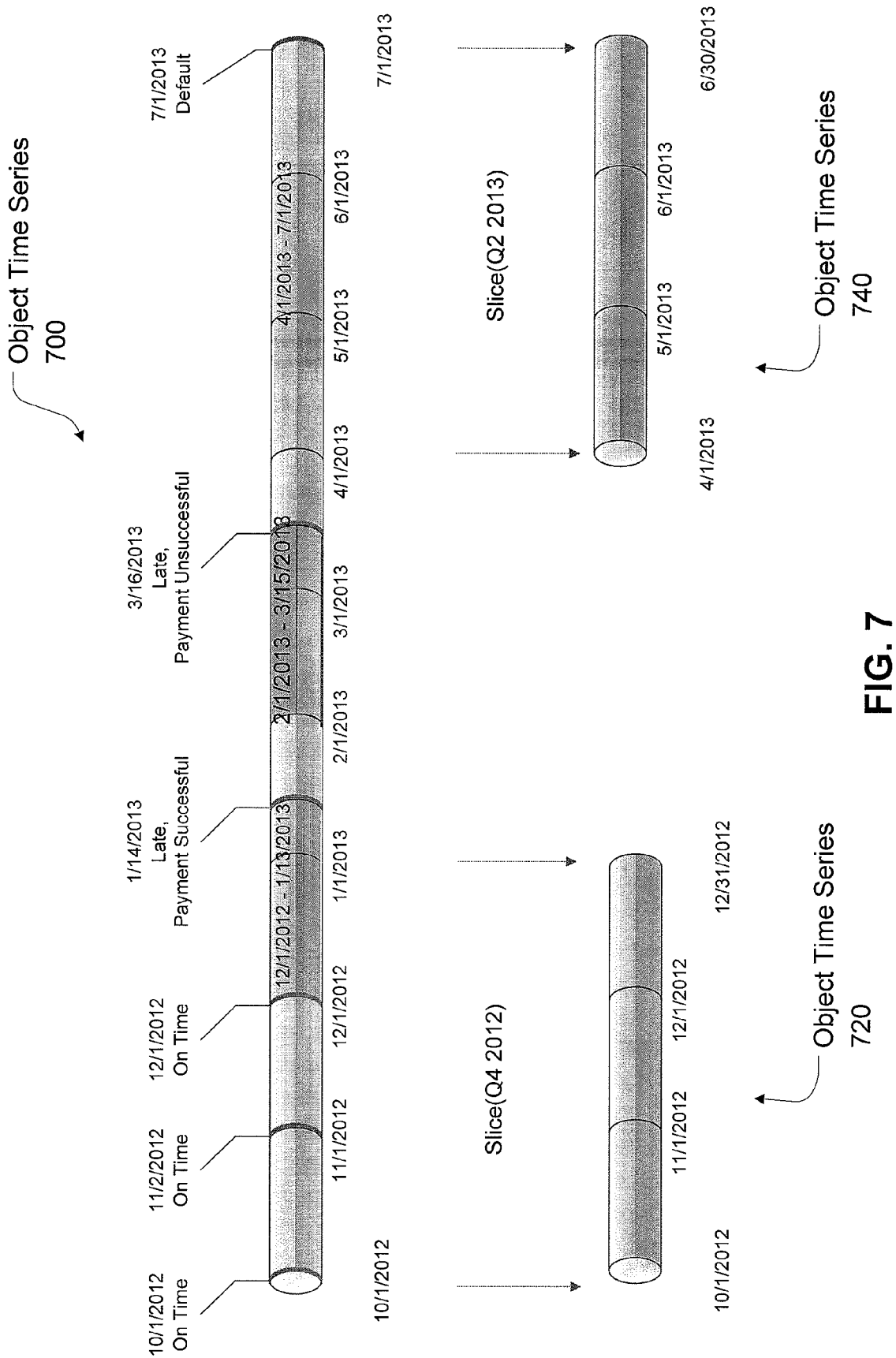
FIG. 7 illustrates an example figure that may be generated and presented to a user to visualize an Object Time Series and the slicing of the Object Time Series.

FIG. 7 illustrates an example figure that may be generated and presented to a user to visualize an Object Time Series 700 and the slicing of the object time series. In the example of FIG. 7, two slicing functions are performed on the Object Time Series 700.

The first slicing function is Slice (Q4 2012), which executes computer-implemented instructions that automatically performs a slicing function that may slice the fourth quarter of the year 2012 from the Object Time Series 700. This may result in the generation of Object Time Series 720, which includes the three months in the fourth quarter of the year 2012 and the objects associated with the three months.

In some embodiments, the generated Object Time Series 720 may be further sliced. For example, a splicing function may be performed on the Object Time Series 720 to create another Object Time Series that has an equal or less duration of time as the Object Time Series 720.

In some embodiments, all the objects involved with the original Object Time Series 700 are kept in the generated Object Times Series 720. In some other embodiments, choices of which objects, properties, and/or value types may be kept and/or excluded may be specified in a splicing function. For example, a user may specify that he or she does not want to see whether payments are successful.

The second slicing function is Slice (Q2, 2013), which may execute computer-implemented instructions that automatically performs a slicing function that may slice the second quarter of the year 2013 from the Object Time Series 700. This may result in the generation of Object Time Series 740, which includes the three months in the second quarter of the year 2013 and the objects associated with the three months.

Although quarterly slicing is used as an example in FIG. 7, in some other embodiments, slicing functions may also be based on other arbitrary time intervals. Slicing a traditional time series is difficult because metadata needs to be looked up separately for the arbitrary time intervals. If there are multiple intervals, looking up metadata stored in a different data structure may involve several separate look ups and access operations. After a new Object Time Series is created by slicing, it may be saved, viewed, accessed, and recalled as any Object Time Series. It may also be sliced to create other Object Time Series.

Figure 8:
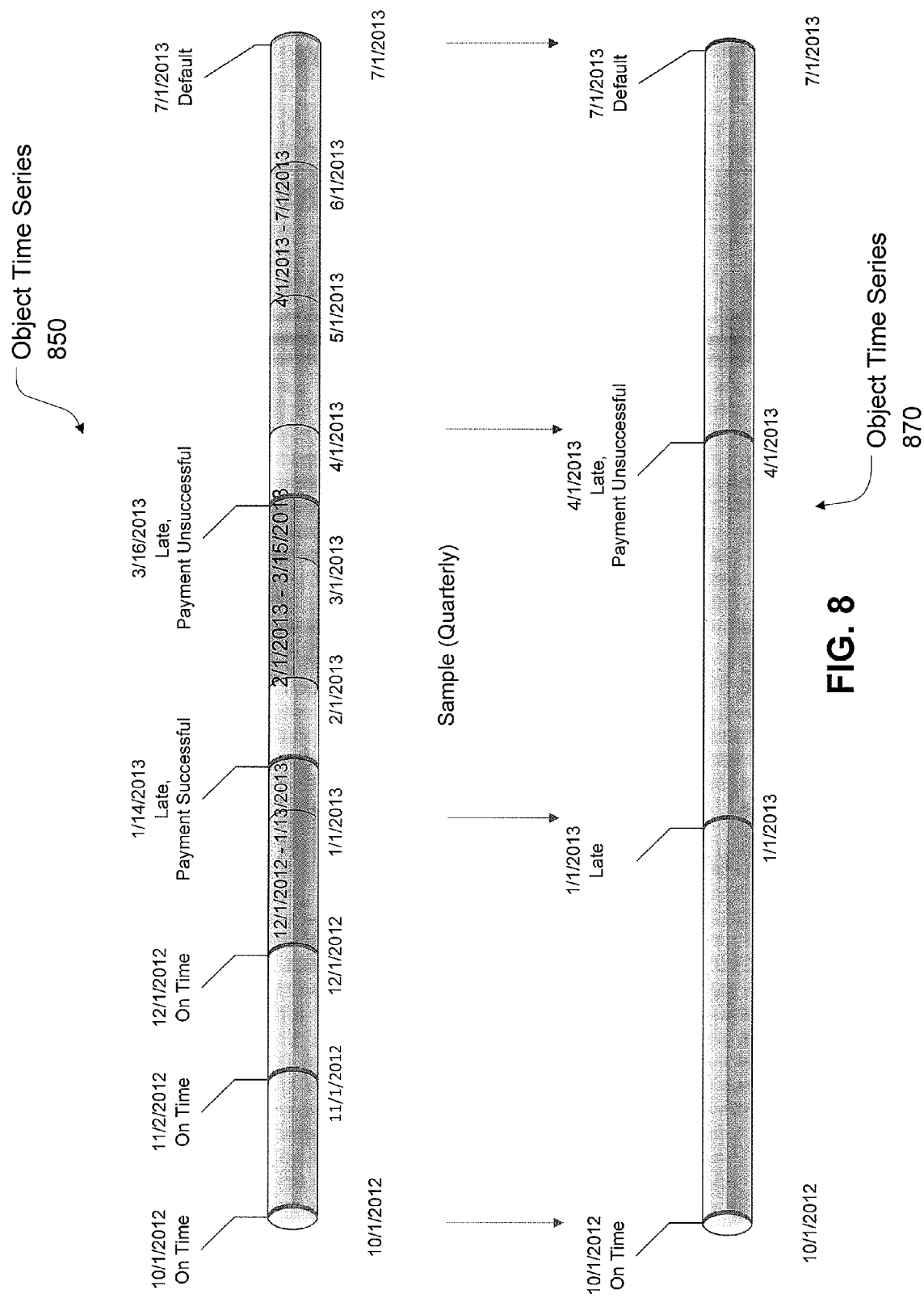
FIG. 8 illustrates a computer system with which certain methods discussed herein may be implemented.

FIG. 8 illustrates an example figure that may be generated and presented to a user to visualize an Object Time Series 850 and the sampling of the Object Time Series 850.

In this example, a sampling function Sample (Quarterly) may execute computer-implemented instructions that automatically perform a sampling function that may sample the Object Time Series on a quarter-to-quarter basis. In some embodiments, a sampling function of an Object Time Series may also allow a user to specify a starting point in time or an ending point in time of a sampling function. In some other embodiments, a sampling function of an Object Time Series may use the beginning of the Object Time Series involved as the default starting point in time for the sampling function.

In this particular example, the "Sample (Quarterly)" function samples the Object Time Series 850 on a quarterly basis (every three months). In this particular embodiment, sampling begins on Oct. 1, 2012. Therefore, the points in time that are sampled on a quarterly basis include: Oct. 1, 2012, Jan. 1, 2012, Apr. 1, 2013, and Jul. 1, 2013.

In some embodiments, the sampling function may generate an Object Time Series 870 based on the sampled points in time and the objects associated with the points in time. In the example in FIG. 8, the Object Time Series 870 includes four points in time, Oct. 1, 2012, Jan. 1, 2013, Apr. 1, 2013, and Jul. 1, 2013.

In some embodiments, the sampling an Object Time Series also includes all the objects associated with the original Object Time Series for each sampled point in time. In this example, including all objects associate with the original Object Time Series 850 would include the Payment object's properties such as timeliness and whether payment was successful.

In some other embodiments, the sampling function may be configured to include a portion of the objects, properties, and/or values associated with the original Object Time Series.

For example, a user may choose to execute a sampling function that does not include the value in the Payment object indicating whether payments were successfully made.

Although quarterly sampling is used as an example in FIG. 8, in some other embodiments, sampling functions may also be based on other arbitrary time intervals. This would be difficult and costly to implement using a traditional time series because all the associated metadata needs to be separately looked up from individual arrays, or by searching a set of intervals. After a new Object Time Series is created by sampling, it may be saved, viewed, accessed as any Object Time Series. It may also be sampled to create other Object Time Series.

Figure 9:
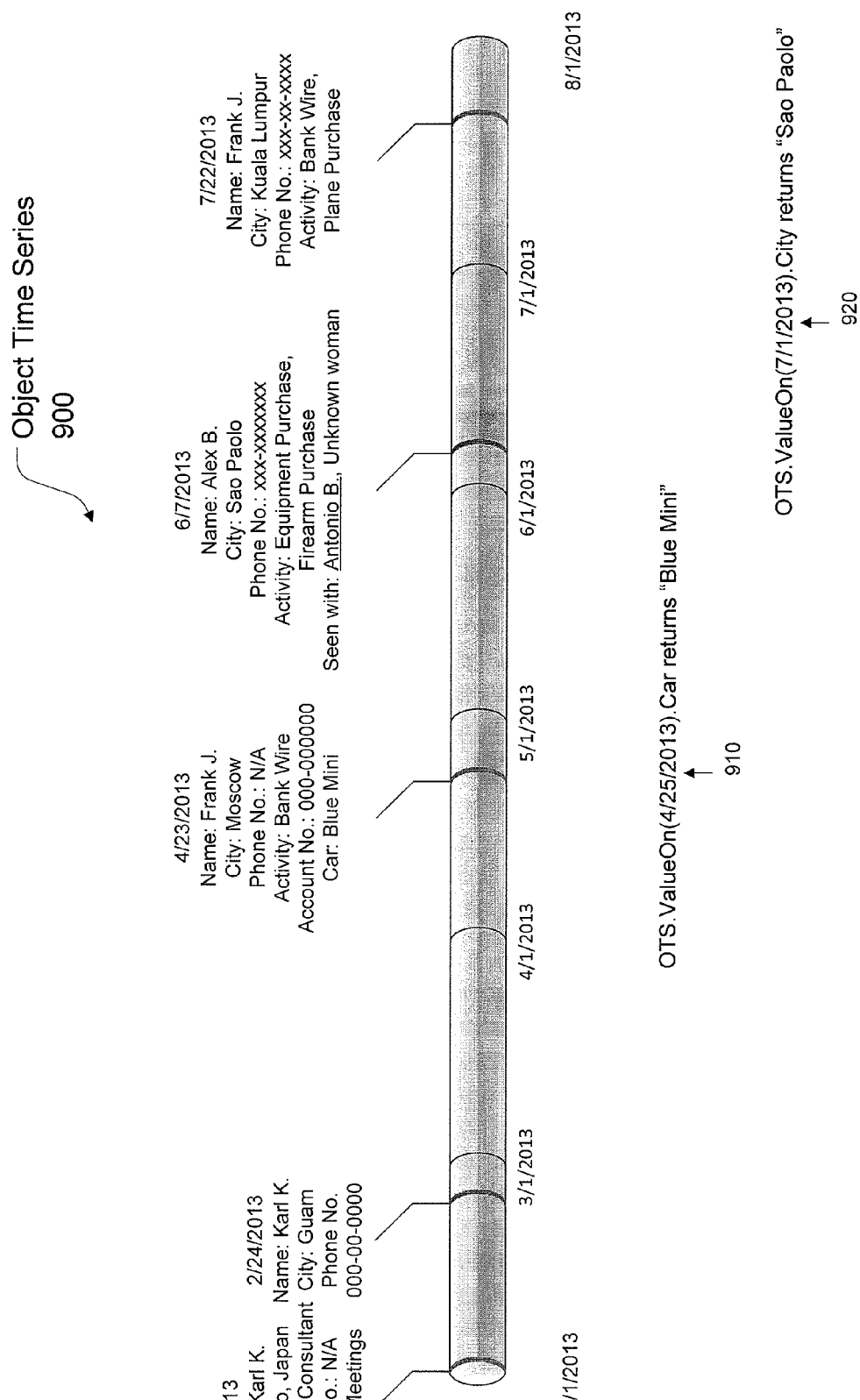
FIG. 9 illustrates an example figure that may be generated and presented to a user to visualize an Object Time Series associated with multiple types of object and functions that may be used to access property values of the person object.

FIG. 9 illustrates an example figure that may be generated and presented to a user to visualize an Object Time Series associated with multiple types of objects and functions that may be used to access property values of the person object. In FIG. 9, Object Time Series 900 is shown. Object Time Series 900 may include multiple types of objects, such as Person and Activity. Each object associated with Object Time Series 900 may include one or more properties that may have one or more values.

In FIG. 9, the Object Time Series 900 includes multiple points in time beginning from Feb. 1, 2013 and ending on Aug. 1, 2013. For example, on Feb. 1, 2013, a person named Karl K. is associated with the date. He was reportedly to be in the city of Kyoto Japan on this date. He is reported to have an occupation of consultant. The Object Time Series 900 does not include or does not have information regarding his phone number. The Object Time Series 900 includes the activity that Karl K. is associated with as meetings.

Karl K. is again recorded in the Object Time Series 900 on Feb. 24, 2013. On the particular day, he was reported to be in Guam. His phone number is also recorded in the Object Time Series 900.

On Apr. 23, 2013, a person named Frank J. is recorded in the Object Time Series 900 as being in the city of Moscow. His phone number is not recorded. The activity associated with the date is a bank wire, and an account number is included. The date in this Object Time Series 900 is also associated with a car, which is a blue Mini in this particular example.

On Jun. 7, 2013, a person named Alex B. is recorded in the Object Time Series 900 as being in the city of Sao Paolo. Alex B. is recorded in the Object Time Series 900 as being seen with a person named Antonio B. and an unknown woman. Because more information about Antonio B. is available, the Object Time Series 900 may display the name Antonio B. as a link so that more information about Antonio B. may be found by following the link. The activity involved on this date is recorded in the Object Time Series 900 as equipment purchase and firearm purchase.

On Jul. 22, 2013, Frank J. is recorded in the Object Time Series 900 as being in the city of Kuala Lumpur. The activities he was associated with on this date include a bank wire and plane purchase.

In some embodiments, an Object Time Series such as Object Time Series 900 may include multiple types of objects. For example, the Object Time Series 900 includes a Person object type, which may include properties such as name, location, phone number, and so forth. The Object Time Series 900 may also include an Event or Activity object type, which may include the activities recorded for a particular point in time, such as bank wires, purchases, meetings, and so forth.

Depending on embodiments, an Object Time Series may be created by using a function such as object TimeSeries status=createObjectTime Series ("String"). As noted in FIG. 9, expressions such as 910: OTS.ValueOn (Apr. 25, 2013). Car may be used to access the car object associated with the date Apr. 25, 2013. In this particular example, the value of the car object type is a Blue Mini. An expression such as 920: OTS.ValueOn (Jul. 1, 2013). City may be used to access the city object associated with the date Jul. 1, 2013. Using an Object Time Series, information, values and properties that would be stored otherwise as metadata as in traditional time series may be implemented and accessed easily. Moreover, information, values and properties, especially non-numerical values, may be visually displayed and associated with respective points in time. For example, for each person associated with a timeline, the person's picture, if available, may be displayed next to the timeline. Other objects in an Object Time Series that may involve properties and values that may be visually displayed may also be configured to be displayed as associated with respective points in time.

Depending on the embodiment, new object types may be introduced into an Object Time Series by applying filters, sampling, slicing, or other functions or criteria on an Object Time Series. For example, in FIG. 9, the city object in the Object Time Series 900 may be used and associated with data/information related to weather in each city. Thus, a new object type may be created that includes weather for each city. In some embodiments, a new Object Time Series may be created, which includes mapping between a plurality of points in time, the city objects/values, and weather objects/values for the cities. Additional objects may also be created based on the city object or any other object in an existing object time series.

Figure 9A:
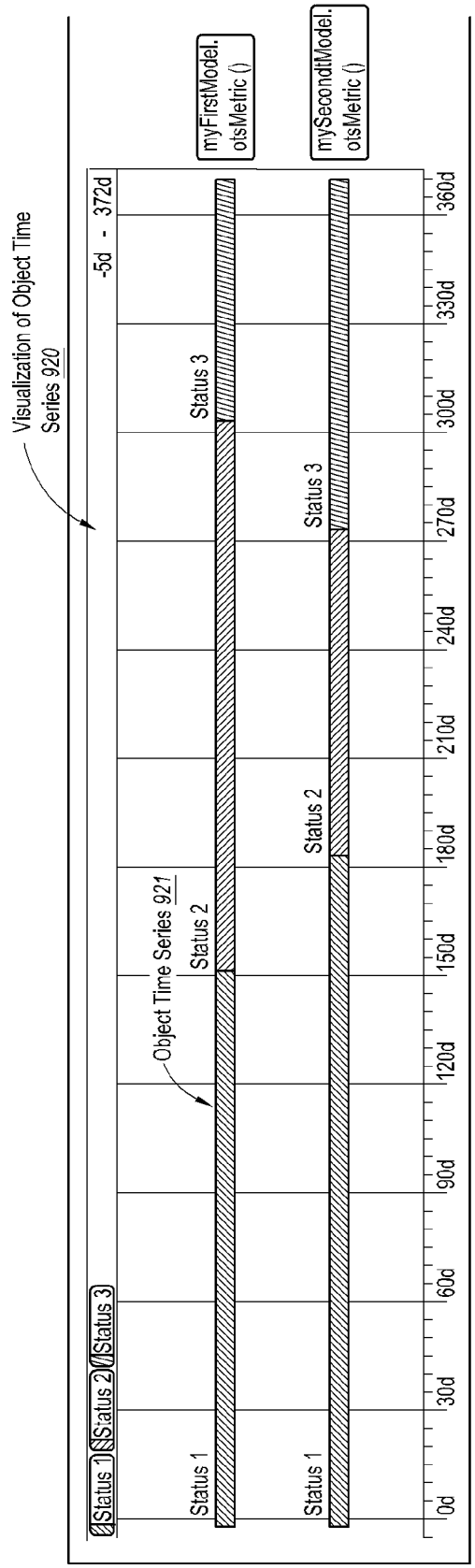
FIG. 9A illustrates an example figure that may be generated and presented to a user to visualize two Object Time Series associated with status objects to show duration.

FIG. 9A illustrates an example figure that may be generated and presented to a user to visualize two Object Time Series associated with status objects to show duration. As can be seen in the visualization 920 of the two Object Time Series, the duration of a status may be easily displayed and presented to users using Object Time Series. In some embodiments, horizontal bars with various colors and/or patterns may easily show the transition from one status to another. The length of each status bar in 920 may also represent duration of a status. For example, Status 1 Object Time Series 921 has a duration of approximately 180 days. The duration may be easily presented as the length of the horizontal status bar.

Figure 9B:
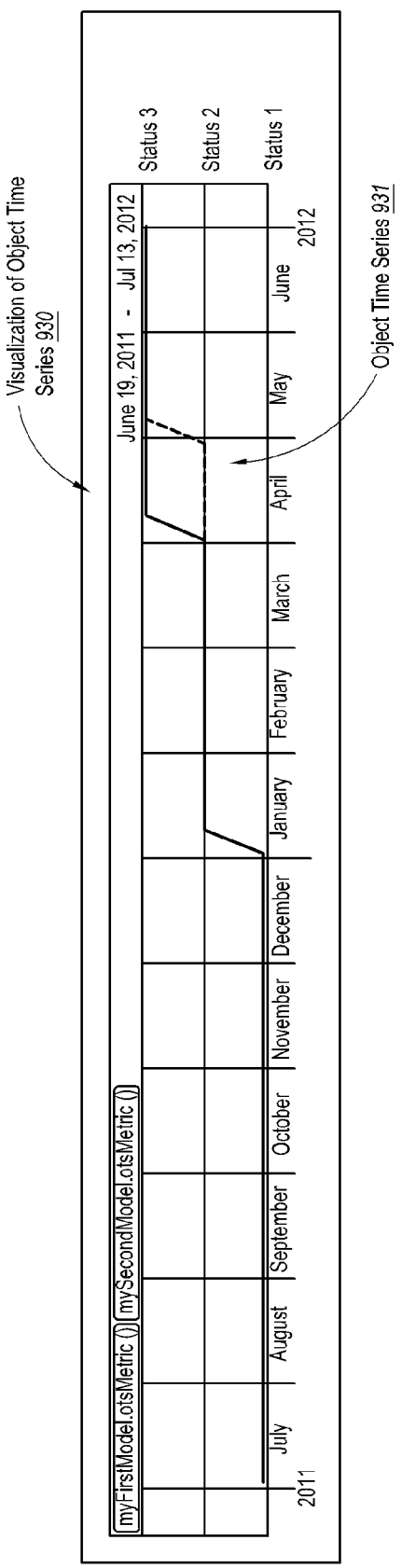
FIG. 9B illustrates an example figure that may be generated and presented to a user to visualize two Object Time Series associated with status objects indicating progress over time.

FIG. 9B illustrates an example figure that may be generated and presented to a user to visualize two Object Time Series associated with status objects indicating progress over time. As shown in this figure, in some embodiments, the visualization 930 of two Object Time Series may be implemented as two lines. In this example, status 1 is represented as the lowest status vertically. Status 3 is represented as the highest status vertically. Status 2 is in the middle between status 1 and 3. Object Time Series 931, for example, switched from status 2 to status 3 around May 2012.

Figure 9C:
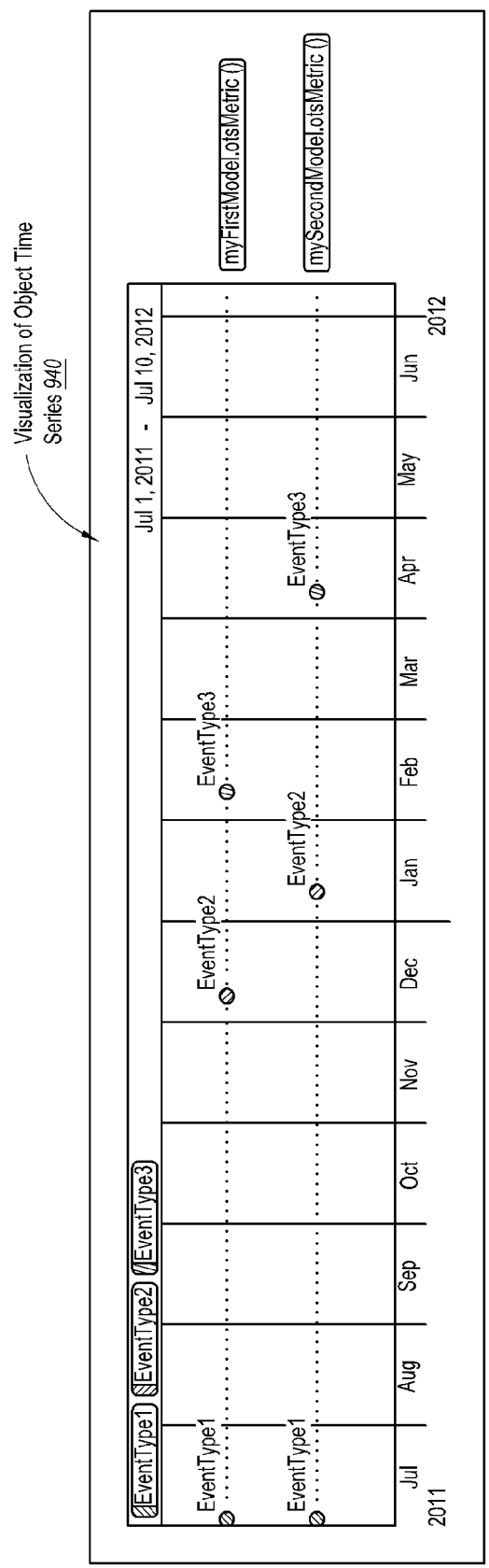
FIG. 9C illustrates an example figure that may be generated and presented to a user to visualize two Object Time Series associated with events.

FIG. 9C illustrates an example figure that may be generated and presented to a user to visualize two Object Time Series associated with various events. As shown in the visualization 940 of the two Object Time Series in FIG. 9C, the two Object Time Series are associated with 3 event types each. The events may be displayed in the same visualization by arranging event types related to the first Object Time Series on top, and event types related to the second Object Time Series below the first Object Time Series. Using this visualization technique, events and event types associated with the two Object Time Series may be compared to each other directly.

Figure 9D:
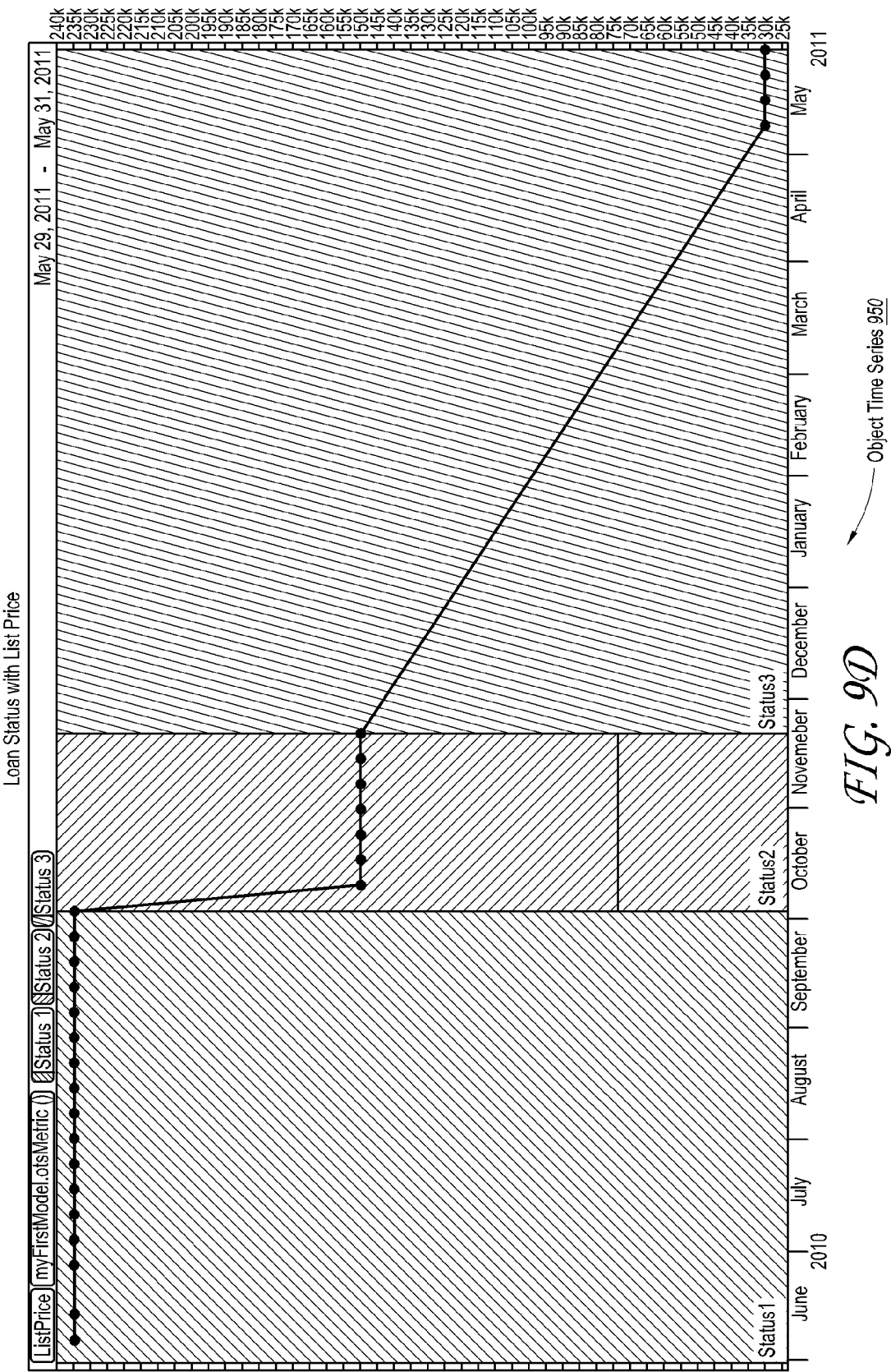
FIG. 9D illustrates an example figure that may be generated and presented to a user to visualize an Object Time Series associated with a status object.

FIG. 9D illustrates an example figure that may be generated and presented to a user to visualize an Object Time Series associated with a status object and a range of values associated with each status. In FIG. 9D, the Object Time Series 950 involves statuses that are related to various amounts. For example, as shown in FIG. 9D, Status 3 is associated with amounts ranging from 30K to approximately 150K. Using a visualization technique as shown in FIG. 9D, ranges of values associated with an object may also be displayed and associated directly with a plurality of points in time. In particular FIG. 9D represents one type of visualization that combines the renderings for status (e.g. the background color), events (e.g. the event dots), and progress (e.g. the line graph portion).

Figure 9E:
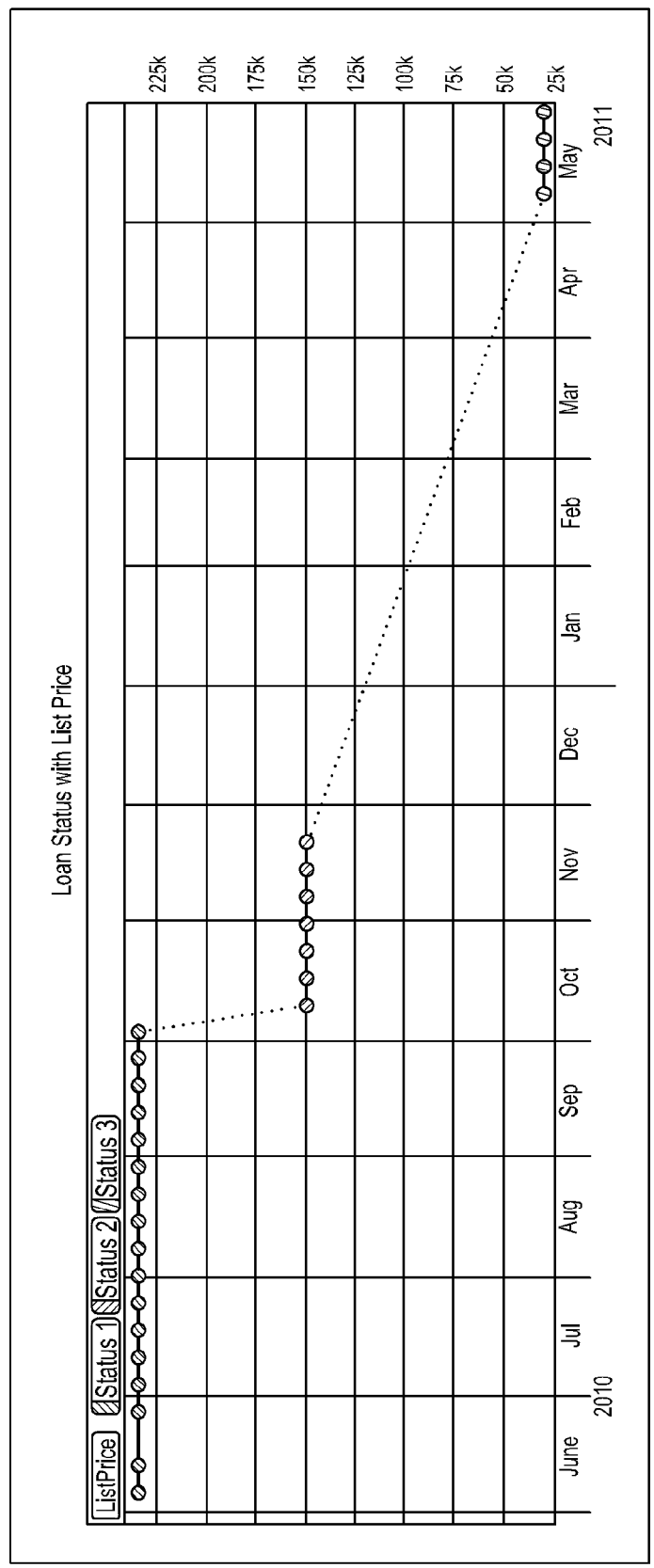
FIG. 9E illustrates an example figure that may be generated and presented to a user to visualize an Object Time Series associated with a status object and transitions among the various statuses.

FIG. 9E illustrates an example figure that may be generated and presented to a user to visualize an Object Time Series associated with a status object, ranges of values involved with each status, and transitions among the various statuses. As shown in FIG. 9E, three different statuses are involved in the Object Time Series 960 in this example. Status 1 is associated with list prices above $225K, and the transition from status 1 to status 2 happened around October 2010. Status 2 is associated with list prices around $150K, and the transition from status 2 and status 3 took place between November 2010 and May 2011. Status 3 is associated with list prices above $25K but below $50K. Like with FIG. 9E, this figure represents one type of visualization that combines the renderings for status (e.g. the blue, green, and orange colors), events (e.g. the event dots), and progress (e.g. the line graph portion).

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
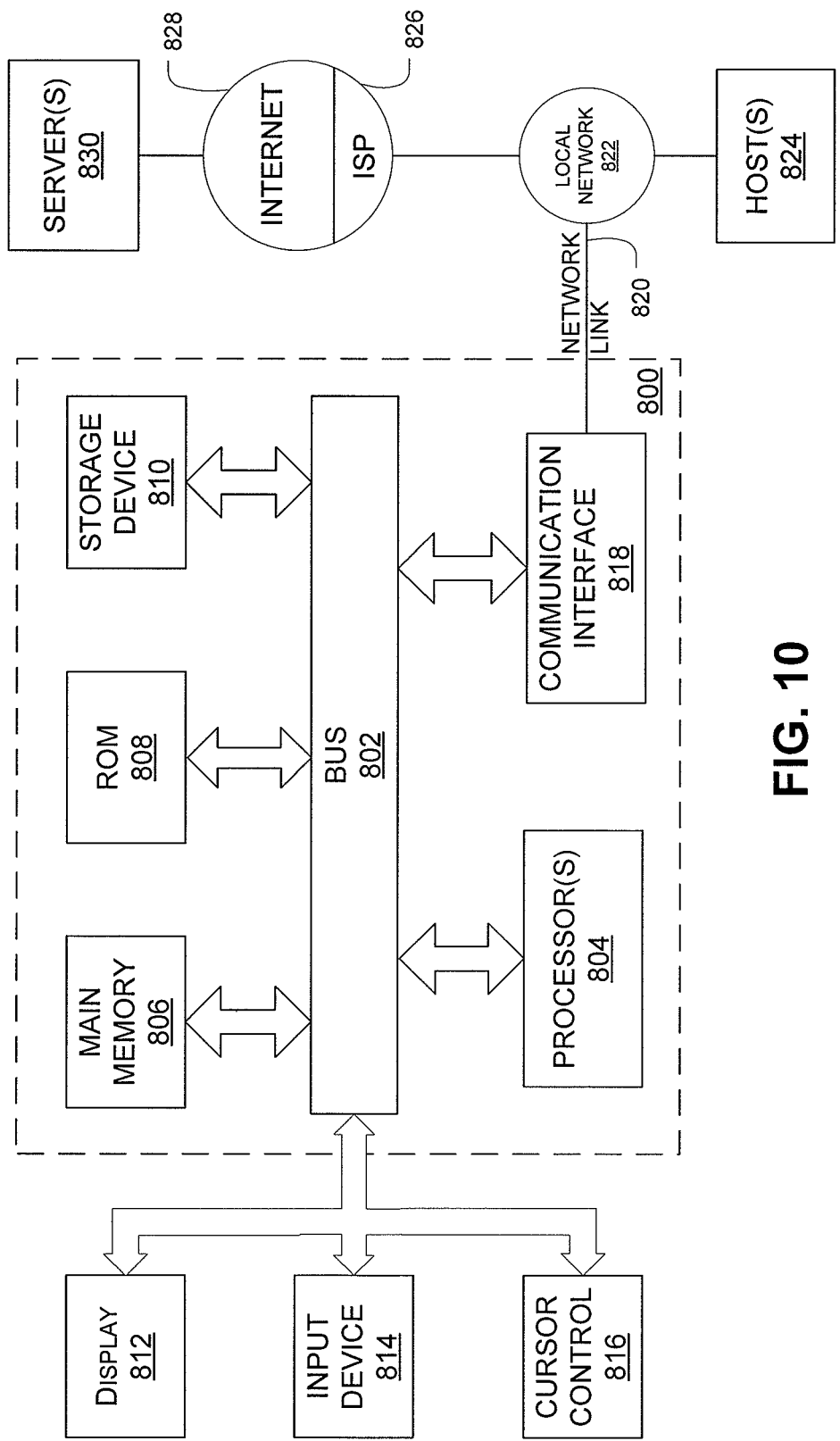
FIG. 10 illustrates a computer system with which certain methods discussed herein may be implemented.

For example, FIG. 10 is a block diagram that illustrates a computer system 800 upon which an embodiment may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer implemented method comprising:
   under control of a computing environment having one or more hardware processors, the computing environment comprising one or more physical computing systems configured to process large amounts of data,
   receiving, by the computing environment, data related to a plurality of points in time;
   receiving, by the computing environment, input data related to one or more objects, wherein each object of the one or more objects comprises a data container for properties, and wherein each property of the properties comprises one or more property types corresponding to one or more property values, and wherein the one or more objects are retrieved from a non-transitory computer-readable storage medium;
   determining, from among the one or more objects, one or more non-event objects based on the input data, wherein each non-event object of the one or more non-event objects comprises a property value which has a non-numerical value;
   determining, from among the one or more objects, one or more event objects based at least in part on an association of the one or more event objects with the one or more non-event objects;
   creating an object time series of a duration based on the plurality of points in time, wherein each point in time of the plurality of points in time is associated with at least one object of the one or more non-event objects or the one or more event objects;
   and
   generating a visual representation of the object time series including representations of the one or more event objects with at least one respective point in time, the one or more non-event objects with at least one respective point in time, and at least one non-numerical value associated with the one or more non-event objects, and wherein the visual representation of the object time series further comprises the object time series as a bar or graph arranged generally horizontally or in landscape manner, with each object associated directly into the bar or graph and associated with at least one respective point in time on the object time series.

2. The computer implemented method of claim 1, wherein the object time series is sampled based on a frequency, wherein the frequency is at least one of weekly, bi-weekly, monthly, quarterly, or annually; and
   creating a second object time series using the sampled object time series and objects associated with the sampled object time series.

3. The computer implemented method of claim 1, wherein the object time series is sliced based on a period of time that is of equal or shorter length of the duration of the object time series; and
   creating a second object time series using the sliced object time series and objects associated with the sliced object time series.

4. The computer implemented method of claim 1, wherein the one or more objects associated with the object time series is accessed by a function call comprising the name of the object time series and a direct request to access one or more non-numerical values associated with the one or more objects.

5. The computer implemented method of claim 1, wherein the one or more objects further comprise at least one other object, and wherein the at least one other object comprises at least one property value which has at least one non-numerical value.

6. The computer implemented method of claim 5, wherein the at least one other object is visually represented in association with at least one respective point in time.

7. The computer implemented method of claim 1, wherein the object time series is sampled based on an irregular time interval; and
   creating a second object time series using the sampled object time series and objects associated with the sampled object time series.

8. A computer system comprising:
   a computing environment, the computing environment comprising one or more physical computing systems configured to process large amounts of data;
   one or more computer processors;
   a tangible storage device storing a module configured for execution by the one or more computer processors to:
     receive, by the computing environment, data related to a plurality of points in time;
     receive, by the computing environment, input data related to a one or more objects, wherein each object of the one or more objects comprises a data container for properties, and wherein each property of the properties comprises one or more property values, and wherein the one or more objects are retrieved from a second tangible storage device;
     determine, from among the one or more objects, one or more non-event objects based on the input data, wherein each non-event object of the one or more non-event objects comprises a property value which has a non-numerical value;

determine, from among the one or more objects, one or more event objects based at least in part on an association of the one or more event objects with the one or more non-event objects;

create an object time series of a duration based on the plurality of points in time, wherein each point in time of the plurality of points in time is associated with at least one object of the one or more non-event objects or the one or more event objects; and generate a visual representation of the object time series including representations of the one or more event objects with at least one respective point in time, the one or more non-event objects with at least one respective point in time, and at least one non-numerical value associated with the one or more non-event objects, and wherein the visual representation of the object time series further comprises each object of the one or more event objects or the one or more non-event objects as visually connected with at least one respective point in time on the object time series.

9. The computer system of claim 8, wherein the object time series is sampled based on a frequency, wherein the frequency is at least one of weekly, bi-weekly, monthly, quarterly, or annually; and the one or more processors are configured to:

create a second object time series using the sampled object time series and objects associated with the sampled object time series.

10. The computer system of claim 8, wherein the object time series is sliced based on a period of time that is of equal or shorter length of the duration of the object time series; and the one or more processors are configured to:

create a second object time series using the sliced object time series and objects associated with the sliced object time series.

11. The computer system of claim 8, wherein the one or more objects associated with the object time series is accessed by a function call comprising the name of the object time series and a direct request to access one or more non-numerical values associated with the one or more objects.

12. The computer system of claim 8, wherein the one or more objects further comprise at least one other object, and wherein the at least one other object comprises at least one property value which has at least one non-numerical value.

13. The computer system of claim 12, wherein the at least one other object is visually represented in association with at least one respective point in time.

14. The computer system of claim 8, wherein the object time series is sampled based on an irregular time interval; and the one or more processors are configured to:

create a second object time series using the sampled object time series and objects associated with the sampled object time series.

15. A non-transitory computer-readable storage medium comprising computer-executable instructions that direct a computing system to:

under control of a computing environment, the computing environment comprising one or more physical computing systems configured to process large amounts of data, receive, by the computing environment, data related to a plurality of points in time;

receive, by the computing environment, input data related to a one or more objects, wherein each object of the one or more objects comprises a data container for properties, and wherein each property of the properties comprises one or more property values, and wherein the one or more objects are retrieved from a second non-transitory computer-readable storage medium;

determine, from among the one or more objects, one or more non-event objects based on the input data;

determine, from among the one or more objects, one or more event objects based at least in part on an association of the one or more event objects with the one or more non-event objects;

create an object time series of a duration based on the plurality of points in time, wherein each point in time of the plurality of points in time is associated with at least one object of the one or more non-event objects or the one or more event objects; and generate a visual representation of the object time series including representations of the one or more event objects with at least one respective point in time, the one or more non-event objects with at least one respective point in time, and at least one value associated with the one or more non-event objects, and wherein the visual representation of the object time series further comprises each object of the one or more event objects or the one or more non-event objects visually connected with at least one respective point in time on the object time series.

16. The non-transitory computer-readable storage medium of claim 15, wherein the object time series is sampled based on a frequency, wherein the frequency is at least one of weekly, bi-weekly, monthly, quarterly, or annually; and the computing system is further directed to:

create a second object time series using the sampled object time series and objects associated with the sampled object time series.

17. The non-transitory computer-readable storage medium of claim 15, wherein the object time series is sampled based on an irregular time interval; and the computing system is further directed to:

creating a second object time series using the sampled object time series and objects associated with the sampled object time series.

18. The non-transitory computer-readable storage medium of claim 15, wherein the object time series is sliced based on a period of time that is of equal or shorter length of the duration of the object time series; and the computing system is further directed to:

creating a second object time series using the sliced object time series and objects associated with the sliced object time series.

19. The non-transitory computer-readable storage medium of claim 15, wherein the one or more objects associated with the object time series is accessed by a function call comprising the name of the object time series and a direct request to access one or more non-numerical values associated with the one or more objects.

20. The non-transitory computer-readable storage medium of claim 15, wherein the one or more objects further comprise at least one other object and wherein the at least one other object comprises at least one property value which has at least one non-numerical value.

* * * * *